(12) United States Patent
Nozaki et al.

(10) Patent No.: US 7,652,849 B2
(45) Date of Patent: Jan. 26, 2010

(54) FLEXIBLE CABLE POSITIONING STRUCTURE AND MAGNETIC DISK DRIVE

(75) Inventors: Hirofumi Nozaki, Kanagawa (JP); Hiroki Kitahori, Kanagawa (JP); Hiroshi Matsuda, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 555 days.

(21) Appl. No.: 11/525,321

(22) Filed: Sep. 21, 2006

(65) Prior Publication Data

US 2007/0086116 A1 Apr. 19, 2007

(30) Foreign Application Priority Data

Oct. 14, 2005 (JP) .............................. 2005-300979

(51) Int. Cl.
   G11B 33/12 (2006.01)
   G11B 21/02 (2006.01)
   G11B 25/04 (2006.01)
(52) U.S. Cl. ............... 360/264.2; 360/97.01; 360/245.9
(58) Field of Classification Search ............. 360/97.01, 360/98.01, 264.2, 245.9; 174/254; 439/67, 439/77; 361/736, 749, 760
See application file for complete search history.

(56) References Cited

U.S. PATENT DOCUMENTS

| | | | | |
|---|---|---|---|---|
| 5,095,396 A | * | 3/1992 | Putnam et al. | ........... 360/264.2 |
| 5,276,572 A | * | 1/1994 | Kinoshita et al. | ........ 360/97.01 |
| 5,337,202 A | * | 8/1994 | Jabbarai et al. | .......... 360/97.01 |
| 5,396,384 A | * | 3/1995 | Caldeira et al. | .......... 360/98.01 |
| 5,499,161 A | * | 3/1996 | Hosseinzadeh et al. | ..... 361/749 |
| 5,508,860 A | * | 4/1996 | Takagi et al. | .............. 360/97.01 |
| 5,760,997 A | * | 6/1998 | Koyanagi et al. | ........ 360/97.01 |
| 5,907,452 A | * | 5/1999 | Kan | ......................... 360/97.01 |
| 5,909,338 A | * | 6/1999 | Butler et al. | ............. 360/97.01 |
| 6,388,834 B1 | * | 5/2002 | Bernett et al. | ............ 360/97.01 |
| 7,070,421 B2 | * | 7/2006 | Nozaki et al. | ................. 439/67 |
| 7,495,866 B2 | * | 2/2009 | Izumi et al. | .............. 360/264.2 |
| 2001/0013989 A1 | * | 8/2001 | Saiki et al. | ............... 360/78.04 |
| 2005/0190489 A1 | * | 9/2005 | Izumi et al. | .............. 360/97.02 |

FOREIGN PATENT DOCUMENTS

| | | | | |
|---|---|---|---|---|
| GB | 2240210 A | * | 7/1991 | |
| JP | 2004-039674 | | 2/2004 | |
| JP | 2004241033 A | * | 8/2004 | |
| JP | 2005190504 A | * | 7/2005 | |

OTHER PUBLICATIONS

English-machine translation of JP 2004-241033 A to Nakano et al., published on Aug. 26, 2004.*

\* cited by examiner

*Primary Examiner*—William J Klimowicz
(74) *Attorney, Agent, or Firm*—Townsend and Townsend and Crew LLP; John Henkaus

(57) ABSTRACT

A positioning structure for a flexible cable having a movable portion is provided. In one embodiment, an FPC cable mounted to a base is received within a slit of a fixing plate. The FPC cable is disposed perpendicularly to a bottom surface of a base. On the fixing plate is provided a positioning reference which is spaced a predetermined distance from the bottom surface of the base. When the FPC cable is received into the slit, a part thereof is pushed against the bottom surface of the base to create an elastic force. An upper portion of a reinforcing plate affixed to the FPC cable for reinforcement comes into abutment against the positioning reference to establish a vertical position of the FPC cable.

19 Claims, 7 Drawing Sheets (A)

(B)

(A)

(B)

FLEXIBLE CABLE POSITIONING STRUCTURE AND MAGNETIC DISK DRIVE

CROSS-REFERENCES TO RELATED APPLICATIONS

This application claims priority from Japanese Patent Application No. JP2005-300979, filed Oct. 14, 2005, the entire disclosure of which is incorporated herein by reference.

BACKGROUND OF THE INVENTION

The present invention relates to a flexible cable positioning structure superior in positioning a movable portion.

Magnetic disk drives adopt a cable (hereinafter referred to as "FPC cable") which utilizes a flat type flexible printed circuit (FPC) board for electrically connecting a magnetic head and a voice coil with a circuit board. The magnetic head and the voice coil are mounted on a pivotable carriage. A base end portion of the FPC cable is fixed to a base for connection to the circuit board, while a front end portion of the FPC cable is fixed to the carriage for connection to the voice coil and the magnetic head. In the magnetic disk drive, a movable portion of the FPC cable is adapted to deform itself freely and follows a pivotal motion of the carriage while being maintained in a vertical attitude with respect to the bottom surface. With the recent tendency toward reduction in size of the magnetic disk drive, the interior space becomes smaller, and there is a higher possibility that the movable portion comes into contact with a base or a base cover so as to obstruct the operation of the carriage. Moreover, with the reduction in size of the FPC cable, it has become more and more difficult to ensure the space necessary for mounting an electronic module or forming terminals on the base end portion or the front end portion of the cable.

An FPC structure of a magnetic disk drive is disclosed in FIGS. 1 and 3 of Patent Literature 1 (Japanese Patent Laid-Open No. Hei 8-106761). The FPC cable formed in a thin type flat shape has flexibility. The FPC cable extends from its base end portion which is a non-movable portion to its front end portion which is a non-movable portion through a movable portion. A reinforcing plate is affixed to the back side of the base end portion. The FPC cable is bent downward at a right angle at an edge of the base end portion and is connected to the movable portion. The movable portion is fixed to a carriage through a mounting hole formed in the front end portion so as to retain its attitude perpendicular to a base. According to such a structure, with a pivotal motion of the carriage, the movable portion can be deformed in a direction perpendicular to the plane of the carriage. An AE module and a carriage connector are mounted on the upper surface side of the base end portion in the figure of Patent Literature 1. The base end portion is capable of being bent centrally.

BRIEF SUMMARY OF THE INVENTION

It is necessary that the movable portion of the FPC cable be positioned so as not to contact the bottom surface of the base or the inner surface of a base cover which would obstruct the pivotal motion of the carriage. To prevent contact of the movable portion of the FPC cable with the base or the base cover, it is necessary to ensure a certain or larger spacing between an upper end of the movable portion and the inner surface of the base cover and between lower end of the movable portion and the bottom surface of the base. In the FPC cable, the base end portion usually disposed horizontally relative to the bottom surface of the base and the movable portion usually disposed perpendicularly to the bottom surface of the base are formed integrally. However, to achieve such a structure, it is necessary to use an attitude retaining portion for retaining the attitude of the movable portion. In the magnetic disk manufacturing process, it is relatively easy to realize a tolerance which is set for an outline size of the FPC cable itself or a tolerance which is set for the spacing between the base and the base cover.

However, for the attitude retaining portion, it is necessary that a bent portion be formed near the base end portion in order to vertically dispose the movable portion at a predetermined position within a housing space which is formed by the base and the base cover. In this case, the accuracy of the bending process is limited in comparison with the FPC fabrication accuracy or the like. Moreover, the base end portion is formed using a plurality of materials, including a fixing plate, a reinforcing plate adhesive, and the like, and is subjected to a folding process. This causes accumulation of those dimensional errors. Thus, in a small-sized magnetic disk drive, it has become difficult to maintain the movable portion at a predetermined position.

The FPC cable is formed with a pattern surface on one surface thereof and with a substrate surface on the other surface thereof. For an FPC cable used in a small-sized magnetic disk drive, the width of the FPC cable is reduced, or a carriage is small-sized. In order to ensure a terminal space for a voice coil or a magnetic head at the front end portion, it is desirable for the pattern surface of the movable portion to be positioned on a side-wall side A space for mounting an electronic component is necessary on the pattern surface of the base end portion. Further, in a small-sized magnetic disk drive used recently, there are some cases where the following method is employed. That is, an FPC connector is mounted on the base end portion and is connected directly to a substrate connector mounted on a circuit board. In this case, to mount both an electronic component and the FPC connector on the base end portion within a small space, it is useful for the base end portion to be folded into two sections as shown in FIG. 1 of Patent Literature 1.

In this case of the base end portion folded into two sections, the electronic component is mounted on the pattern surface of the surface side, while the connector is mounted on the pattern surface of the back surface side. In the case where the base end portion has a folding structure, and the pattern surface of the movable portion is provided on a side wall side of the base, the attitude retaining portion connected from the base end portion to the movable portion cannot be realized in a manner wherein the base end portion is folded only once, shown as in Patent Literature 1. This increases bent portions and makes the structure more complicated. With the conventional structure having the attitude retaining portion that relies on the bending accuracy for the attitude of the movable portion, it becomes difficult to ensure the position of the movable portion within the tolerance. Thus, it is necessary to provide a positioning structure which can ensure the position of an upper or lower end of the movable portion within the tolerance even in the case where the structure of the attitude retaining portion becomes complicated in order to allow the pattern surface to face toward a side wall of the base.

Accordingly, the present invention provides an FPC cable positioning structure which is simple and high in accuracy. The present invention also provides a magnetic disk drive suitable for adoption of such a positioning structure and a magnetic disk drive adopting such a positioning structure.

In a first aspect of the present invention, there is provided a positioning structure for a flat type flexible cable. In the flexible cable, a base end portion is fixed to a fixing member, a front end portion is fixed to a movable member, and a horizontal portion extends along a reference surface while leaving a predetermined spacing. Since the flexible cable has flexibility in a direction perpendicular to its plane ("out-of-plane direction" hereinafter), a side end of the horizontal portion disposed through a predetermined spacing relative to the reference surface does not contact the reference surface even upon movement of the movable portion. As a result, the movement of the movable portion is not obstructed.

A spring portion and an abutting portion are formed at a side end of the horizontal portion to maintain the spacing between the reference surface and the side end. When the base end portion is fixed to the fixing member, the spring portion is abutted against the reference surface and is deflected, creating an elastic force. With the elastic force of the thus-deflected spring portion, the abutting portion moves until abutment against a positioning reference. As a result, the positioning of the side end of the horizontal portion is established at the position where the abutting portion is contacted with the positioning reference. Thus, by merely fixing the base end portion and the front end portion, it is possible to easily maintain the spacing between the side end of the horizontal portion and the reference surface.

In the flexible cable, since a base film itself has an elastic force, the spring portion may be constituted by a part of the flexible cable projecting from one side end of the horizontal portion. With the spring portion near the base end portion provided, the horizontal portion positioned from the spring portion to the front end portion may move freely with movement of the movable member. If a reinforcing portion for reinforcing the horizontal portion located between the spring portion and the abutting portion is provided, it is possible to prevent a positioning error of the horizontal portion from occurring. The occurrence of the positioning error is due to the horizontal portion being deflected with an elastic force remaining in the spring portion after contact of the abutting portion against the positioning reference with the elastic force of the spring portion. The reinforcing portion may be constituted, for example, by using a reinforcing plate as a separate member or by reinforcing the flexible cable itself. If the reinforcing portion is constituted by an elastic plate, the spring portion may also be constituted by a part of the elastic plate.

In a second aspect of the present invention, there is provided a magnetic disk drive adopting a flexible cable positioning structure. In the magnetic disk drive, a base corresponds to a fixing member, and a carriage corresponds to a movable member. If a positioning reference is provided on a fixing plate for fixing a base end portion of the flexible cable to the base, the positioning reference may be disposed near the base end portion without the addition of any new part. In the case where the positioning structure of the present invention is adopted, even if the magnetic disk drive is small-sized, an electronic component mounting portion and a connector mounting portion are provided at the base end portion, while a connecting portion for a voice coil and a connecting portion for a magnetic head are formed at the front end portion. This is convenient for reducing the size.

In a third aspect of the present invention, there is provided a magnetic disk drive suitable for reduction in size by using the flexible cable positioning structure described in the above first aspect. An electronic component mounting portion and a connector mounting portion are provided at the base end portion of the flexible cable. The connector mounting portion is folded back at the boundary between it and the electronic component mounting portion and is positioned on the back side of the electric component mounting portion. Thus, both the connector mounting portion and the electronic mounting portion may be provided in a small space.

Further, an attitude retaining portion is connected to the base end portion to position the pattern surface on a side-wall side of the base in the horizontal portion of the flexible cable. Once the pattern surface is positioned on the side-wall side of the base, a connecting portion for a voice coil is formed on one surface of the flexible cable at the front end portion, while on the other surface is formed a connecting portion for a magnetic head. This structure is suitable for the reduction of size. The structure of the attitude retaining portion becomes complicated for positioning the pattern surface of the base end portion to the side-wall side of the base at the horizontal portion. By adopting the positioning structure described in the above first aspect, however, the positioning accuracy of the horizontal portion may be ensured within the tolerance without being influenced by the structure of the attitude retaining portion.

In the present invention, it is possible to provide an FPC cable positioning structure with high accuracy, which may be realized with a simple structure. Further, in the present invention, it is possible to provide a magnetic disk drive suitable for adopting such a positioning structure and a magnetic disk drive adopting such a positioning structure.

DETAILED DESCRIPTION OF THE INVENTION

Figure 1:
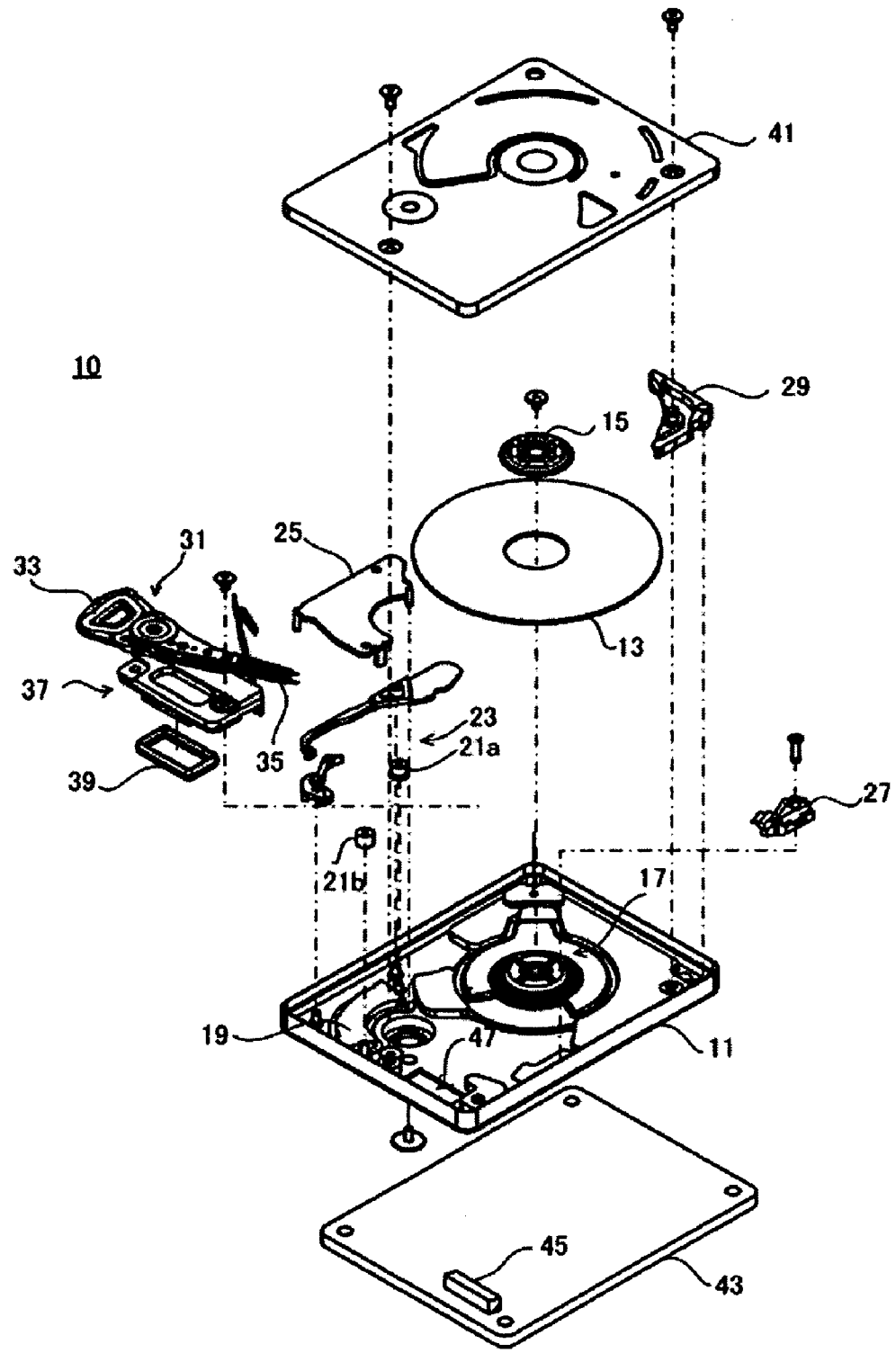
FIG. 1 is an exploded perspective view of a magnetic disk drive according to an embodiment of the present invention.

FIG. 1 is an exploded perspective view of a magnetic disk drive embodying the present invention. In the magnetic disk drive 10, a spindle motor 17 and a voice coil magnet 19 are mounted on a base 11. A magnetic disk 13 is fixed with a clamp 15 to a spindle shaft of the spindle motor 17. A circulation filter block 29, a ramp mechanism 27, a latch mechanism 23, crash stops 21a, 21b, and a voice coil yoke 25 are mounted on the base 11.

Further, a carriage 31 which carries thereon a voice coil 33 and a magnetic head 35, an FPC assembly 37, and a seal packing 39 are mounted on the base 11. After these elements are mounted on the base 11, the base 11 is covered with a base cover 41. A circuit board 43 with a substrate connector 45 mounted thereon is attached to the outside of the base 11. An FPC connector mounted to the FPC assembly 37 and the substrate connector 45 are connected to each other at the position of a base aperture 47. By adopting the method of connecting the FPC connector and the substrate connector 45, which are directly connected with each other, it is possible to improve the reliability of connection between the FPC cable and the circuit board 43 in comparison with a connection method wherein terminals are formed on a pattern surface of the FPC cable.

Figure 2:
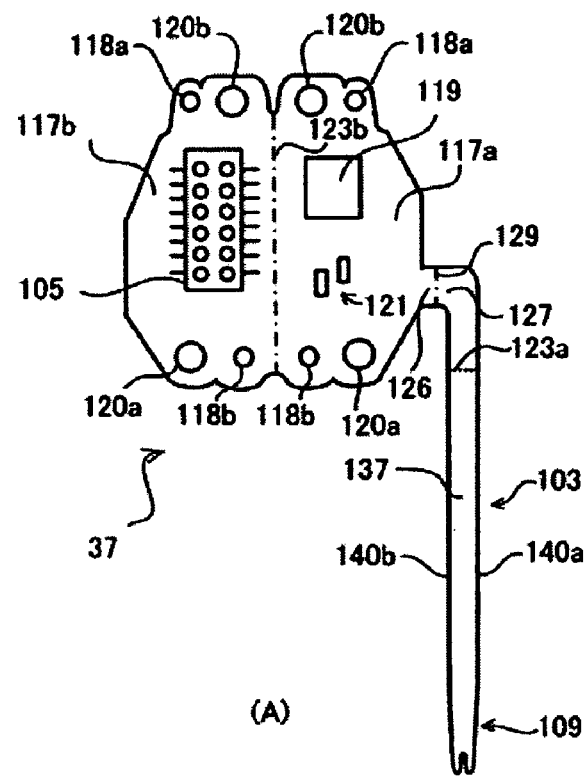
FIGS. 2A-B are diagrams of an FPC assembly as developed onto a plane.
Figure 2:
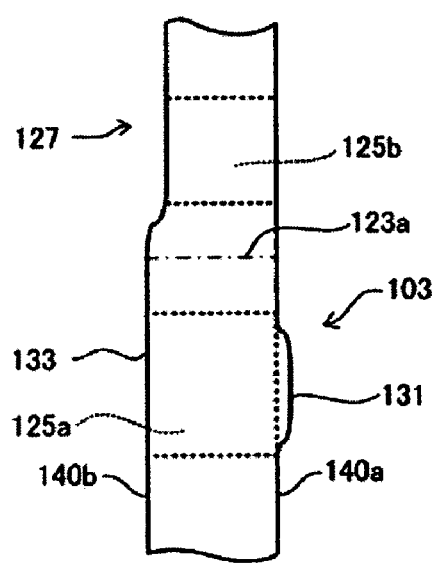
Figure 3:
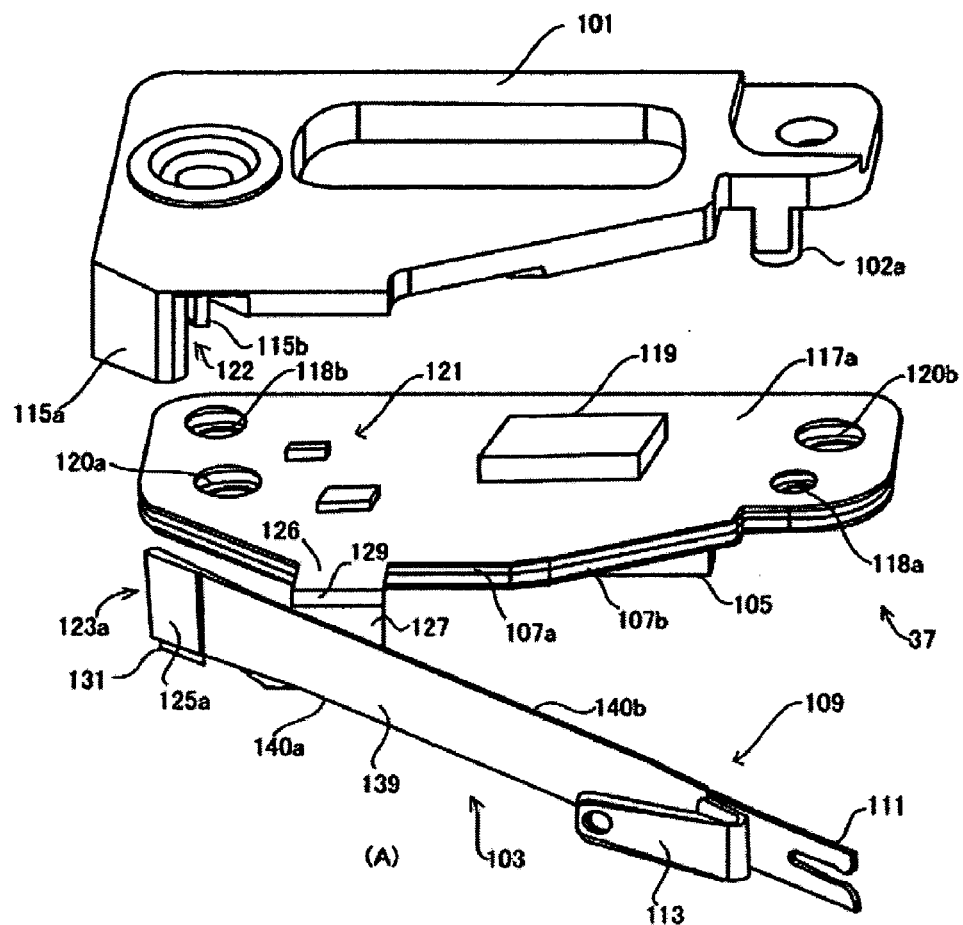
FIGS. 3A-B are perspective views of the FPC assembly in a completely assembled state and a fixing plate.
Figure 3:
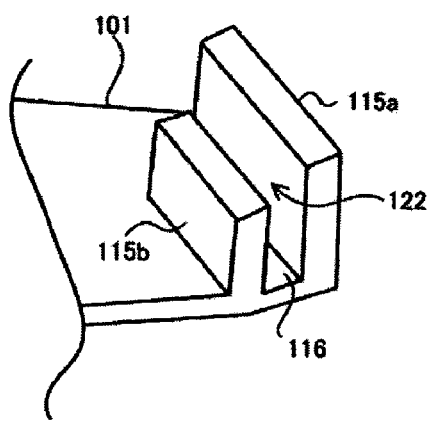
Figure 4:
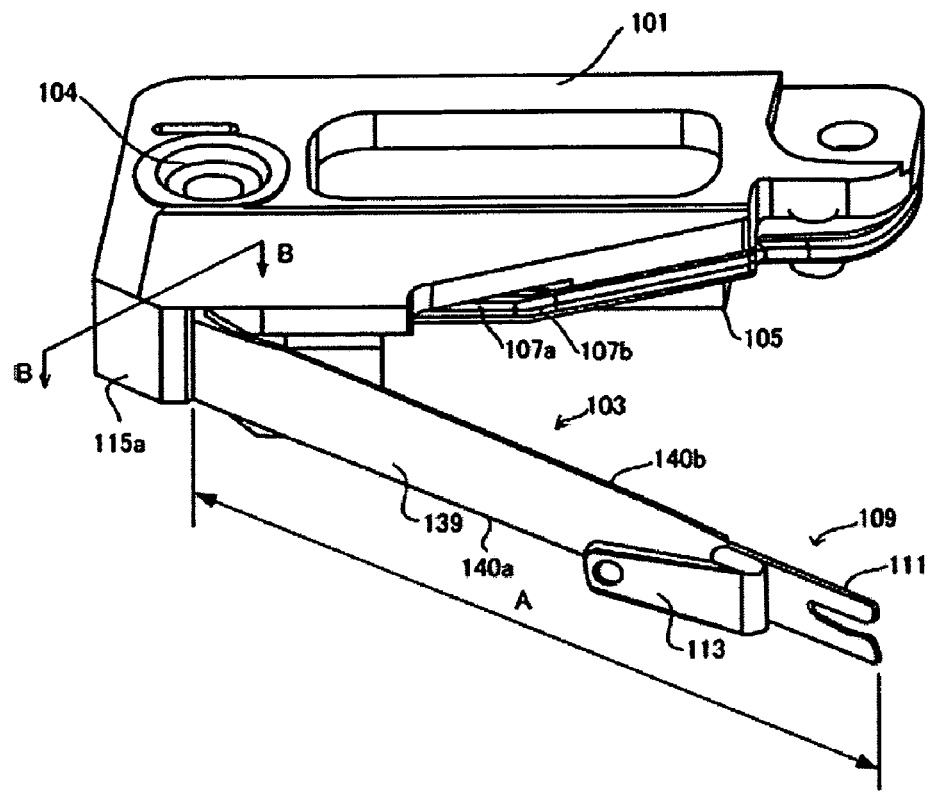
FIG. 4 is a perspective view showing an installed state of the FPC assembly into the fixing plate.

FIG. 2 illustrates the FPC assembly as developed onto a plane. FIG. 3 is a perspective view showing an assembled state of the FPC assembly. FIG. 4 is a perspective view showing a state in which a fixing plate has been installed into the FPC assembly. In FIG. 2, the FPC assembly 37 is made up of an FPC cable, backing plates 107a, 107b(see FIG. 3), an electronic module 119, a capacitor 121, and an FPC connector 105.

The FPC cable is of a structure wherein wiring patterns are formed on one surface of a base film of polyimide by precision etching of copper foil. The surface of the wiring patterns is covered for protection with a cover film of, for example, polyamide or polyester. The surface of the FPC cable with the wiring patterns positioned thereon and the surface with the base film positioned thereon will hereinafter be referred to as a pattern surface and a substrate surface, respectively. The FPC cable is made up of base end portions 117a, 117b, a drawn-out portion 126, a connecting portion 127, a horizontal portion 103, and a front end portion 109.

The base end portions 117a and 117b are folded at a folding portion 123b. The base end portions 117a and 117b are disposed so that the pattern surface faces upward, and electric components such as an electronic module 119, e.g., a shock sensor, a head amplifier, or a temperature sensor, a capacitor 121 for absorbing the surge of a power line, and an FPC connector 105, are mounted on the cover layer of the pattern surface.

Two stainless steel backing plates 107a and 107b (see FIG. 3) formed in the substantially same shape as the profile of the base end portions 117a and 117b are affixed to back surfaces of the base end portions or to the substrate surface. The backing plates 107a and 107b function as reinforcing members for mounting electric components. At the position of the folding portion 123b, the backing plates 107a and 107b are separate from each other so as not to obstruct folding of the base end portions 117a and 117b.

In the base end portions 117a and 117b, there are formed engaging holes 118a, 118b and screw inserting through holes 120a, 120b so as to extend through the FPC cable and the backing plates 107a, 107b. A band-like drawn-out portion 126 of the FPC cable extends from an end of the base end portion 117a and is connected to the connecting portion 127. At the boundary between the drawn-out portion 126 and the connecting portion 127, a bent portion 129 is defined. The backing plate 107a, which is affixed to the back side of the base end portion 117a, extends halfway around the drawn-out portion 126 and the connecting portion 127 so that the drawn-out portion 126 and the connecting portion 127 may play the role of retaining the attitude of the horizontal portion 103 when the FPC assembly 37 is assembled.

The connecting portion 127 is bent in a crank shape, extends up to a folding portion 123a, and is connected to the horizontal portion 103. The horizontal portion 103 extends from the folding portion 123a up to the front end portion 109. A backing plate is not affixed to the horizontal portion 103, and the FPC cable may deform freely in the out-of-plane direction while retaining its flexibility. The horizontal portion 103 has a width which is defined by both a side end 140a on the base side and a side end 140b on the base cover 41 side. Since the pattern surface is contiguous to the base end portion 117a, it is also positioned on the upper side in the horizontal portion 103, and the substrate surface is positioned on the back side.

FIG. 2(B) is an enlarged diagram of the horizontal portion 103 in the vicinity of the folding portion 123a. On the substrate surface side of the horizontal portion 103, a reinforcing plate 125b is affixed to the connecting portion 127 which lies on the base end portion 117a side relative to the folding portion 123a, while a reinforcing plate 125a is affixed to the horizontal portion 103 which lies on the front end portion side relative to the folding portion 123a. The reinforcing plates 125a and 125b are each formed by a thin plastic film. The side end 140a of the horizontal portion 103 partially projects at the affixed position of the reinforcing plate 125a, constituting a spring portion 131.

The width of the reinforcing plate 125a is about the same as the width of the horizontal portion 103, and one end portion of the reinforcing plate matches the side end 140b of the horizontal portion 103, constituting an abutting portion 133. The reinforcing plates 125a and 125b function to improve the workability at the time of folding back the horizontal portion 103 at the position of the folding portion 123a with respect to the connecting portion 127, but the reinforcing plate 125a also functions to attain the effective positioning structure of this embodiment as will be described later.

FIG. 3 is a perspective view of the FPC assembly 37 in a completed state of assembly and a fixing plate 101 for fixing the FPC assembly to the base 11. In the FPC assembly 37, as shown in FIG. 3(A), the base end portions 117a and 117b are folded back at the folding portion 123b (see FIG. 2) so that the backing plates 107a and 107b affixed respectively to the base end portions are superimposed one on the other. Further, the connecting portion 127 is bent at the bent portion 129 so as to become perpendicular to the bottom surface of the base 11. From the drawn-out portion 126 up to the halfway of the connecting portion 127, the backing plate 107a integrally extends from the base end portion 117a. As a result, the shape of the bent portion 129 is defined by the rigidity of the backing plate to retain the attitude of the horizontal portion 103.

The connecting portion 127 is folded back at the folding portion 123a to form the horizontal portion 103. The horizontal portion 103 extends up to the front end portion 109 so that the plane thereof is perpendicular to the bottom of the base 11. In order that the horizontal portion 103 may deform freely in the out-of-plane direction without contact with the bottom surface of the base 11 or with the inner surface of the base cover 41 when the carriage 31 performs a pivotal motion, the side ends 140a and 140b need to be spaced a predetermined distance from the bottom of the base 11 and also from the inner surface of the base cover 41. If this is attained by only the bent structure of the connection 127, the following accuracies need to be maintained within respective predetermined tolerances: the accuracy of the thickness of each of the base end portions 117a and 117b of the FPC cable, the accuracy of the thickness of each of the backing plates 107a and 107b, the accuracy of the thickness of an adhesive for bonding the base end portions 117a, 117b and the backing plates 107a, 107b with each other, the machining accuracy of the bent portion 129 and the folding portion 123a, and the fabrication accuracy of the width of the horizontal portion 103.

In order for the position of the side ends 140a and 140b to be within a predetermined tolerance, it is necessary to ensure predetermined fabrication accuracy and assembling accuracy of a large number of parts. In addition, there is a limit to the machining accuracy of the bent portion 129 and the folding portion 123a. As a result, in the structure wherein the attitude of the horizontal portion 103 is retained by the bent portion 129 and connecting portion 127 reinforced by the backing plates 107a, 107b and is also retained by the folding portion 123a, it is difficult to highly accurately perform the positioning of the side ends 140a and 140b. In this embodiment, as will be described below, the positioning of the side ends 140a and 140b may be accurately performed by utilizing the spring portion 131, the abutting portion 133 and a positioning reference 116.

The fixing plate 101 functions to fix the FPC assembly 37 to the bottom surface of the base 11 and retain the attitude of the FPC cable so as not to obstruct the pivoting motion of the carriage 31. An engaging lug 102a is formed on a lower surface of the fixing plate 101. The engaging lug 102a is fitted in an engaging hole 118a formed in the folded and superimposed base end portions 117a and 117b. Further, another engaging lug (not shown) formed in the lower surface of the fixing plate 101 is fitted in an engaging hole 118b. As a result, the FPC assembly is secured to the fixing plate 101.

As shown also in FIG. 3(B), slit side walls 115a and 115b for forming a slit 122 are formed at an end portion of the fixing plate 101. The bottom of the slit 122 functions as the positioning reference 116. When the FPC assembly 37 is fixed to the fixing plate 101, the horizontal portion 103 with the reinforcing plate 125a affixed thereto and the connecting portion 127 with the reinforcing plate 125b affixed thereto are inserted into the slit 122. In the state shown in FIG. 4, the fixing plate 101 is secured to the bottom of the base 11 with a screw inserted through a screw inserting through hole 104 so that the base end portions 117a and 117b are fixed to the base.

In the horizontal portion 103, as shown in FIG. 4, the substrate surface 139 is positioned on the magnetic disk 13 side from the folding portion 123a up to the front end portion 109. The pattern surface 137 is positioned on the side-wall side of the base 11. The folding portion 123a is provided for the base end portions 117a and 117b to mount the electronic module 119 and the FPC connector 105 with the folding structure and for positioning the pattern surface 137 to the side-wall side of the base 11 with respect to the horizontal portion 103. At the front end portion 109, an insertion plate 111 made of stainless steel is affixed to the FPC cable. The insertion plate 111 is used for fixing the front end portion 109 to the carriage 31. Moreover, at the front end portion 109, a backing plate 113 made of stainless steel is affixed to the base film of the FPC cable. A terminal for head connected to a magnetic head is formed on the back surface of the backing plate 113.

Figure 5:
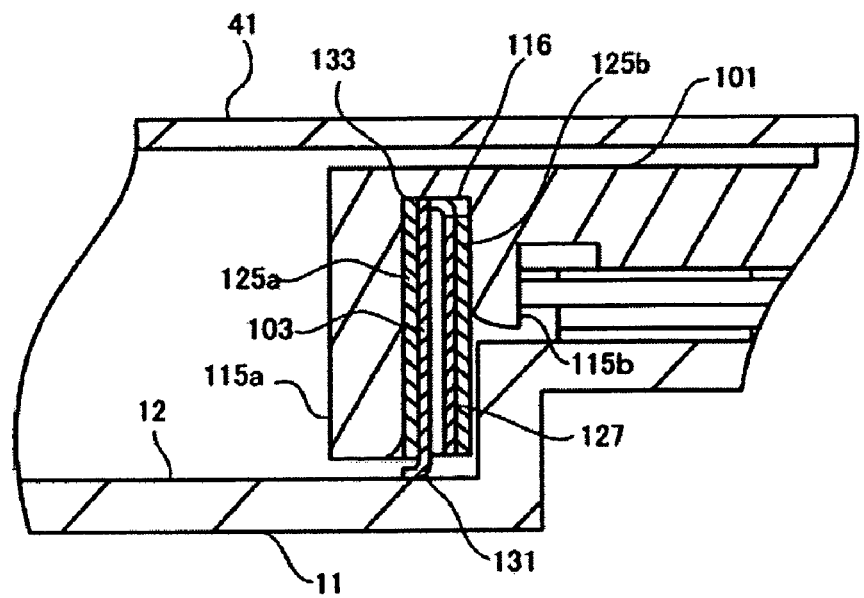
FIG. 5 is a sectional view taken on line B-B in FIG. 1, showing a state in which the FPC assembly is fixed to a base through the fixing plate and an insertion plate at a front end portion of the FPC assembly is fixed to a carriage.

In FIG. 4, the horizontal portion 103 extending from an outlet of the slit 122 up to the insertion plate 111, indicated with arrow A, and the front end portion 109 are movable portions adapted to move with the pivotal motion of the carriage 31. The position of this area needs to be defined accurately in the vertical direction within a housing. FIG. 5 is a sectional view taken along line B-B in FIG. 4, showing a state in which the base end portion is fixed to the base 11 with the fixing plate 101, and the front end portion 109 is fixed to the carriage with the insertion plate 111.

The horizontal portion 103 with the reinforcing plate 125a affixed to the substrate surface and the connecting portion 127 with the reinforcing plate 125b affixed to the substrate surface are received within the slit 122 formed by the slit side walls 115a and 115b. The abutting portion 133 and the spring portion 131 function as a positioning portion for the FPC cable. The distance between the abutting portion 133 and an end portion of the spring portion 131 is larger than the spacing between the reference surface 116 and a bottom surface 12 of the base 11.

As a result, when the FPC assembly 37 with the positioning portion received in the slit 122 is fixed to the base 11 with the fixing plate 101, the spring portion 131 is pushed against the bottom surface 12 of the base 11 and is deformed to produce an upward elastic force. The reinforcing plate 125a slides upward until the abutting portion 133 provided at an end portion comes into contact with the positioning reference 116 and stops. If a predetermined spacing of the positioning reference 116 relative to the bottom surface 12 of the base 11 is maintained, the side ends 140a and 140b of the horizontal portion 103 are established their position on the basis of the positioning reference 116.

Figure 6:
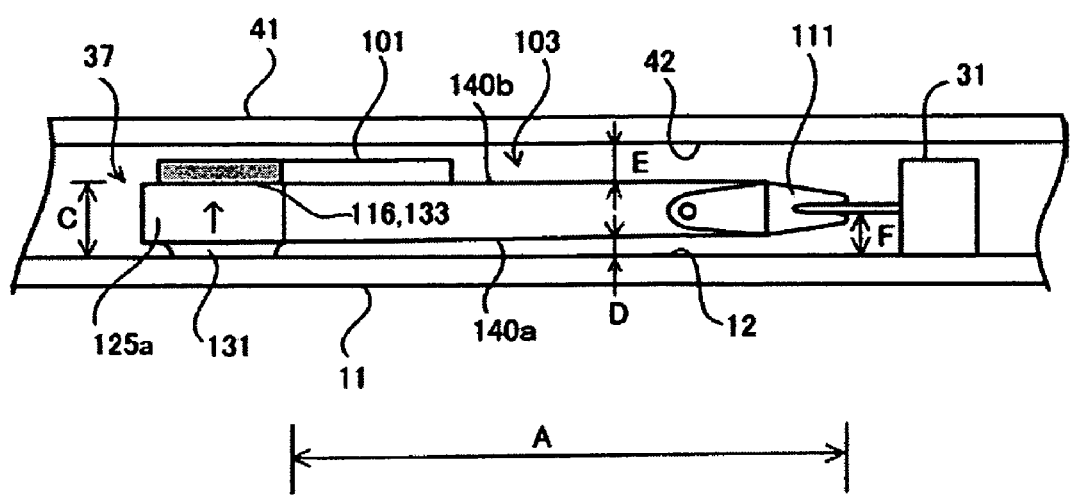
FIG. 6 is a diagram explaining the operation of a positioning structure using the FPC assembly and the fixing plate.

FIG. 6 is a schematic diagram illustrating the operation of the positioning structure constituted by both the FPC assembly 37 and the fixing plate 101 that are both shown in FIG. 3. In the FPC assembly 37, in its state shown in FIG. 4, the base end portion is fixed to the base 11 with the fixing plate 101, and the front end portion 109 is fixed to the carriage 31 with the insertion plate 111. In the FPC assembly 37, when the carriage 31 performs its pivotal motion, it is necessary that the horizontal portion 103 positioned on the front end portion side relative to the positioning portion be folded in the out-of-plane direction so as not to obstruct the operation of the carriage 31.

To prevent the obstruction, it is necessary to ensure distances D and E from the side ends 140a and 140b of the horizontal portion 103 to the bottom surface 12 of the base 11 and an inner surface 42 of the base cover 41, respectively. In the structure of the FPC assembly described in Patent Literature 1, with respect to ensuring the tolerances of the distances D and E, the accuracy of the folding portion which folds back the base end portion, the accuracy of the thickness of the backing plates and of the adhesive, the accuracy of the folding portions, and the fabrication accuracy of the fixing plate act cumulatively. Thus, the more strict the tolerances of the distances D and E, the more difficult it becomes to ensure the distances. As a result, when the carriage performs its pivotal motion, there is a case where the side ends 140a or 140b contact the bottom surface 12 of the base or the inner surface 42 of the base cover 41, causing an obstacle to controlling the carriage.

In this embodiment, the distances D and E may be easily maintained within the tolerances by the action of the positioning reference 116, the spring portion 131 and the abutting portion 133. In FIG. 6, the positioning reference 116 provided on the fixing plate 101 ensures a tolerance of the distance C relative to the bottom surface 12 of the base. The distance C mainly depends on the fabrication accuracy of the fixing plate 101 and the finishing accuracy of the mounting surface of the base 11. The fixing plate 101 is a molding product of a single material. It is not difficult to maintain the finishing accuracy of the bottom surface 12 of the base within the tolerance, and it is relatively easy to ensure the tolerance of the distance C. Also as to a tolerance set for the distance F between the fixing portion formed on the carriage 31 to which the insertion plate 111 is fixed and the bottom of the base 11, it depends on the fabrication accuracy of the carriage 11 and a pivot unit. As a result, it is possible to ensure the tolerance relatively easily. Since the FPC assembly 37 itself may be formed by etching or by cutting work, it is easy to ensure a dimensional tolerance of the FPC assembly alone.

The spring portion 131 pushes the abutting portion 133 against the positioning reference 116 under an elastic action induced by contact with the base 11. The tolerance of the distance C between the abutting portion 133 and the bottom surface 12 of the base 11 is ensured. The position of the abutting portion 133 matches the position of the side end 140b. The tolerance of the distance D may be ensured by ensuring the fabrication accuracy of the horizontal portion 103. The tolerance of the distance E may be ensured by ensuring the accuracy of the spacing between the bottom surface 12 of the base and the inner surface 42 of the base cover 41. In this positioning structure, the FPC assembly fabricating, machining and assembling accuracies are associated with the base end portion and the connecting portion lying on the base end portion side relative to the position of the positioning portion within the slit 122 in FIG. 3. The FPC assembly fabricating, machining and assembling accuracies do not exert any influence on the accuracy of the distance D and that of the distance E. As a result, it is easy to ensure the tolerances of those distances.

Since the rigidity of the FPC base film is insufficient, the reinforcing plate 125a is provided to prevent the FPC from being bent upon abutment of the abutting portion 133 against the reference surface 116. That is, if the required rigidity of the base film may be maintained, it is not necessary to use the reinforcing plate 125a. The abutting portion 133 may be defined as part of the side end 140b of the FPC cable. Instead of using the reinforcing plate 125a, the rigidity may be enhanced by changing the thickness of the FPC cable itself which lies between the spring portion 131 and the abutting portion 133.

Figure 7:
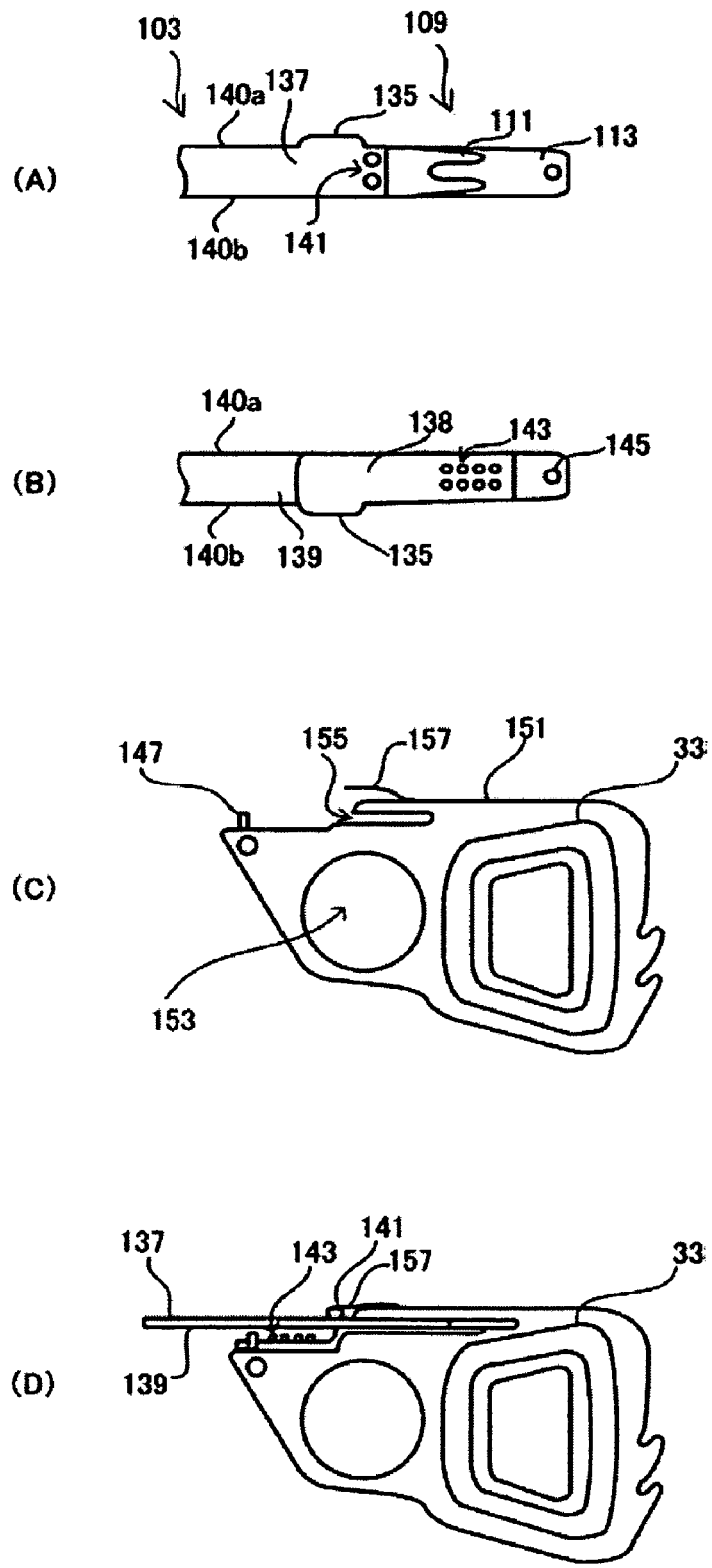
FIGS. 7A-D are diagrams showing the structure of a front end portion of the FPC assembly.

FIG. 7 shows the structure of the front end portion 109 of the FPC assembly 37. In the horizontal portion 103, as shown in FIG. 3, a pattern surface 137 of the FPC cable faces the side wall of the base 11, and a substrate surface 139 faces the magnetic disk 13. FIG. 7(A) is a plan view showing the horizontal portion 103 and the front end portion 109 on the pattern surface 137 side in a vertically inverted state. The FPC cable is folded back to the back side at a folding portion 135. The pattern surface 137 is connected to a pattern surface 138 shown in FIG. 7(B). The insertion plate 111 and the backing plate 113 both made of stainless steel are affixed between the base film portions of the FPC cable which are faced to each other as a result of being folded back at the folding portion 135.

A terminal for coil connected to the voice coil 33 is formed on the pattern surface 137. A terminal 143 for head is formed on the pattern surface 138. An engaging hole 145 is formed in a front end of the backing plate 113. The front end portion of the FPC assembly 37 is fixed to a pivot housing 151 of the carriage 31 shown in FIG. 7(C). A pivot aperture 153 is centrally formed in the pivot housing 151. A pivot unit provided with a bearing mechanism is inserted into the pivot aperture 153. The voice coil 33 is molded to the pivot housing 151. A lead wire 157 is drawn out from a side portion of the pivot housing. Near the lead wire 157 is formed a slit 155 and is further formed an engaging lug 147. FIG. 7(D) shows a state in which the front end portion 109 is fixed to the pivot housing 151.

Upon insertion of the insertion plate 111 into the slit 155, the position of the terminal 141 for coil and that of an end portion of the lead wire 157 match each other. Further, when the pattern surface 138 is bent together with the backing plate 113, the engaging hole 145 matches the engaging lug 147 and is fitted. The terminal 143 for head formed on the pattern surface 138 is positioned in opposition to the reference surface 139, making it possible to connect a lead wire of the magnetic head. Such a structure of the front end portion 109 is effective in ensuring the terminal space in the case where the area of the front end portion 109 and that of the side portion of the pivot housing 151 are small. In order to form the terminal structure shown in FIG. 7(D), the pattern surface 137 needs to be positioned on the side-wall side of the base 11.

In case of adopting the folding structure at the base end portion to mount the FPC connector and the electronic module, a folding portion is provided in the connecting portion for connecting between the base end portion and the horizontal portion to position the pattern surface to the side-wall side of the base, or the connecting portion becomes long, resulting in the structure being complicated. This causes the positioning to be difficult. In the positioning structure of this embodiment, the positioning accuracy of the side end of the horizontal portion may be maintained within its tolerance without being influenced by the structure on the base end portion side with respect to the FPC cable positioning portion. Thus, the positioning structure is effective in positioning the FPC assembly wherein the structure of the connecting portion is complicated.

Figure 8:
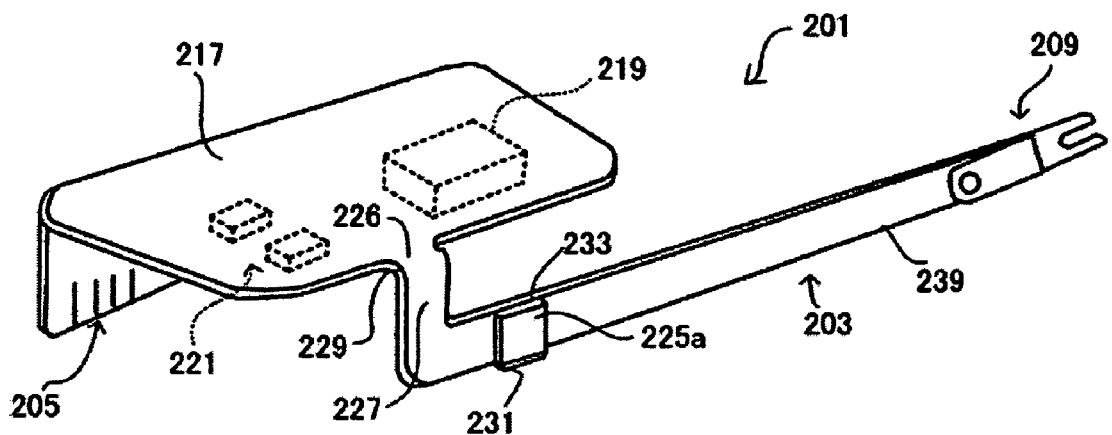
FIG. 8 is a diagram showing another structure of an FPC assembly.

FIG. 8 illustrates another structure of an FPC assembly in order to position a substrate surface 239 of a horizontal portion 203 in an FPC cable to the magnetic disk 13 side. In an FPC assembly 201, the FPC cable is made up of a base end portion 217, a drawn-out portion 226, a connecting portion 227, a horizontal portion 203, and a front end portion 209. In the base end portion 217, a pattern surface is positioned on the back surface (the surface opposed to the bottom surface of the base). An electronic module 219 and a capacitor 221 are mounted on the pattern surface. A backing plate (not shown) serving as a reinforcing member for mounting the electronic module 219 and the capacitor 221 is affixed to a substrate surface which is a surface of the base end portion 217.

One end of the base end portion 217 is bent perpendicularly toward the bottom surface 12 of the base 11. Terminals 205 for connection to the substrate connector are formed on the pattern surface exposed from the cover layer. The drawn-out portion 226, which is band-like, extends from the other end of the base end portion 217, and is bent at a bent portion 229 and is connected to the connecting portion 227. The connecting portion 227 is bent in a crank shape and is connected to the horizontal portion 203. The horizontal portion 203 extends up to the front end portion 209. A backing plate affixed to a surface of the base end portion 217 extends up to the halfway of the connecting portion 227 to retain the attitude of the horizontal portion 203 within the base 11. In the horizontal portion 203, the substrate surface 239 faces the magnetic disk side.

The FPC assembly 201 is different from the FPC assembly 37 in that the FPC connector is not mounted on the base end portion 217 and the terminals 205 of wiring patterns are used for the connection with the circuit board. In this case, it is not necessary to ensure a space for mounting the FPC connector in the base end portion, and it suffices to ensure only the space for mounting the FPC connector. The base end portion is not required to have such a folding structure as in the FPC assembly 37. Thus, the pattern surface with the electronic module 219 and the capacitor 221 mounted thereon may be disposed downward. As a result, the connecting portion 227 extending from the base end portion to the horizontal portion may extend to the carriage side by being bent only once in the bent portion 229, resulting in a simple structure.

Further, in the FPC assembly 201, by forming a spring portion 231 and an abutting portion 233 in the horizontal portion, and by affixing a reinforcing plate 225a made of a plastic material to the FPC cable, it is possible to realize the same positioning structure as in the FPC assembly 37 with use of a fixing plate. In the FPC assembly 201, since it is not necessary to form a folding portion in the connecting portion 227, it is easy to ensure the tolerances of distances D and E in FIG. 6 as compared with the FPC assembly 37. The positioning accuracy may be further improved by adopting the positioning structure including the positioning reference, spring portion 231 and abutting portion 233. This is convenient to implement a small-sized magnetic disk drive.

Figure 9:
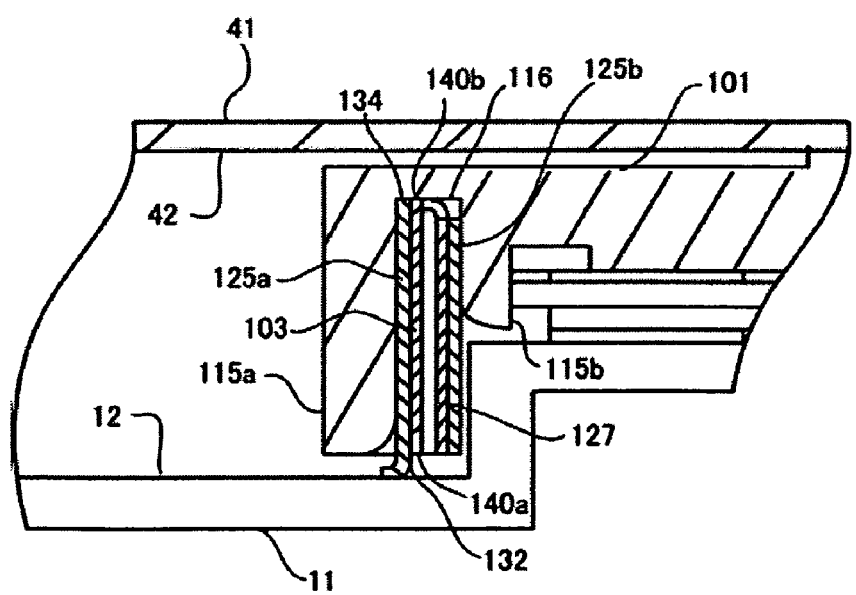
FIG. 9 is a diagram showing another embodiment of the positioning structure.

FIG. 9 illustrates another embodiment of the positioning structure. FIG. 9 shows the same cross section as in FIG. 5. A reinforcing plate 125*a* is affixed to the horizontal portion 103. In the positioning structure shown in FIG. 9, the reinforcing plate 125*a*, which is formed of a plastic material having elasticity, projects from the side end 140*a* of the horizontal portion 103 and forms a spring portion 132. Since the vertical size of the reinforcing plate 125*a* is larger than the spacing between the positioning reference 116 and the bottom surface 12 of the base 11, the spring portion 132 is in contact with the bottom surface 12 of the base and is deformed. The position of the end portion of the reinforcing plate 125*a* on the side opposite to the spring portion 132 matches the position of the side end 140*b* of the horizontal portion 103 to form an abutting portion 134. The action of the spring portion 132 and that of the abutting portion 134 are the same as in the positioning structure shown in FIG. 5. However, this embodiment advantageous in that it is possible to select a material suitable for the spring structure without relying on the elasticity of the FPC cable.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A positioning structure for a flexible cable, comprising:
   a reference surface;
   a flat type flexible cable, the flat type flexible cable including a base end portion, a horizontal portion connected to the base end portion and having side ends extending along the reference surface while leaving a predetermined spacing with respect to the reference surface, a spring portion formed at one of the side ends of the horizontal portion, and an abutting portion formed at the other side end of the horizontal portion; and
   a positioning reference for providing the predetermined spacing with respect to the reference surface;
   wherein when the spring portion and the abutting portion are disposed between the reference surface and the positioning reference, the abutting portion moves until abutment against the positioning reference under an elastic force imparted to the spring portion as abutted against the reference surface.

2. A positioning structure according to claim 1, further comprising a movable member having a fixing portion formed at the position of the predetermined spacing from the reference surface, the flexible cable further including a front end portion connected with the horizontal portion, and the front end portion being fixed to the fixing portion of the movable member.

3. A positioning structure according to claim 1, wherein the spring portion is constituted by a part of the flexible cable projecting from one side end of the horizontal portion, and the abutting portion is defined by the other side end of the horizontal portion.

4. A positioning structure according to claim 1, further comprising a reinforcing portion for reinforcing the horizontal portion, the reinforcing portion being located between the spring portion and the abutting portion.

5. A positioning structure according to claim 4, wherein the reinforcing portion is constituted by a reinforcing plate affixed to the horizontal portion.

6. A positioning structure according to claim 5, wherein the abutting portion is defined by a side end of the reinforcing plate.

7. A positioning structure according to claim 4, wherein the reinforcing portion is constituted by an elastic plate having elasticity and affixed to the horizontal portion, and the spring portion is constituted by a part of the elastic plate projecting from one side end of the horizontal portion.

8. A magnetic disk drive comprising:
   a base;
   a carriage mounted pivotably to the base;
   a magnetic disk mounted rotatably to the base;
   a flat type flexible cable including a base end portion fixed to the base, an attitude retaining portion connected to the base end portion, a horizontal portion connected to the attitude retaining portion and having side ends extending along a bottom surface of the base while leaving a predetermined spacing with respect to the bottom surface of the base, a front end portion connected to the horizontal portion and fixed to the carriage, and a positioning portion having a spring portion formed at one of the side ends of the horizontal portion and an abutting portion corresponding to the spring portion and formed at the other side end of the horizontal portion; and
   a positioning reference for providing the predetermined spacing with respect to the bottom surface of the base;
   wherein when the positioning portion is disposed between the bottom surface of the base and the positioning reference, the abutting portion moves until abutment against the positioning reference under an elastic force imparted to the spring portion as abutted against the bottom surface of the base.

9. A magnetic disk drive according to claim 8, further comprising a fixing plate for fixing the base end portion to the base, the fixing plate having a slit formed with the positioning reference.

10. A magnetic disk drive according to claim 8, wherein the base end portion has an electronic component mounting portion with an electronic component mounted thereon, and the attitude retaining portion has a connecting portion extending vertically toward the base.

11. A magnetic disk drive according to claim 8, wherein the base end portion has on a pattern surface side thereof an electronic component mounting portion with an electronic component mounted thereon and a connector mounting portion with a connector mounted thereon, the connector mounting portion being folded back at a boundary between the connector mounting portion and the electronic component mounting portion and positioned on a back side of the electronic component mounting portion.

12. A magnetic disk drive according to claim 11, wherein a folding portion for positioning the pattern surface to a side wall of the base is formed in a boundary between the attitude retaining portion and the horizontal portion.

13. A magnetic disk drive according to claim 12, further comprising a fixing plate for fixing the base end portion to the base, the fixing plate having a slit formed with the positioning reference, and wherein the positioning portion is received in the slit.

14. A magnetic disk drive according to claim 13, wherein a part of the attitude retaining portion is received in the slit together with the positioning portion.

15. A magnetic disk drive according to claim 11, wherein the carriage carries thereon a voice coil and a magnetic head, a connecting terminal for the voice coil is formed on the pattern surface of the flexible cable at the front end portion, and a connecting terminal for the magnetic head is formed on the pattern surface of the flexible cable folded back to a substrate surface side.

16. A magnetic disk drive according to claim 8, wherein the spring portion is constituted by a part of the flexible cable projecting from a side end of the horizontal portion.

17. A magnetic disk drive according to claim 8, wherein the positioning portion has a reinforcing plate affixed to the horizontal portion, and the spring portion is constituted by a part of the reinforcing plate projecting from one side end of the horizontal portion.

18. A magnetic disk drive according to claim 8, wherein the horizontal portion is deformed with a pivotal motion of the carriage on the front end portion side with respect to the positioning portion.

19. A magnetic disk drive comprising:
  a base;
  a carriage carrying thereon a voice coil and a magnetic head and mounted pivotably to the base;
  a magnetic disk mounted rotatably to the base;
  a flat type flexible cable formed with both a pattern surface and a substrate surface, the flat type flexible cable including a base end portion fixed to the base, an attitude retaining portion connected to the base end portion, a horizontal portion connected to the attitude retaining portion, and a front end portion connected to the horizontal portion and fixed to the carriage; and
  a positioning reference for providing a predetermined spacing with respect to the base;
  wherein an electronic component mounting portion and a connector mounting portion are provided on the pattern surface side at the base end portion, the connector mounting portion being folded back at a boundary between the connector mounting portion and the electronic component mounting portion and positioned on a back side of the electronic component mounting portion, and the pattern surface of the horizontal portion is positioned to a side wall of the base by the attitude retaining portion, the magnetic disk drive further comprising a folding portion at a boundary between the horizontal portion and the attitude retaining portion, a connecting terminal for the voice coil formed on the pattern surface of the flexible cable at the front end portion, and a connecting terminal for the magnetic head formed on the pattern surface which is folded back to the substrate surface side.

* * * * *